United States Patent
Hirota

(10) Patent No.: US 10,307,808 B2
(45) Date of Patent: Jun. 4, 2019

(54) ELECTRIC-RESISTANCE-WELDED PIPE WELDING APPARATUS

(75) Inventor: Yoshiaki Hirota, Tokyo (JP)

(73) Assignee: NIPPON STEEL & SUMITOMO METAL CORPORATION, Tokyo (JP)

(*) Notice: Subject to any disclaimer, the term of this patent is extended or adjusted under 35 U.S.C. 154(b) by 406 days.

(21) Appl. No.: 13/395,728

(22) PCT Filed: Sep. 16, 2010

(86) PCT No.: PCT/JP2010/066014
§ 371 (c)(1),
(2), (4) Date: Mar. 13, 2012

(87) PCT Pub. No.: WO2011/034119
PCT Pub. Date: Mar. 24, 2011

(65) Prior Publication Data
US 2012/0168408 A1    Jul. 5, 2012

(30) Foreign Application Priority Data

Sep. 16, 2009  (JP) ................................. P2009-214885
Sep. 16, 2009  (JP) ................................. P2009-214887

(51) Int. Cl.
*B21C 37/08*    (2006.01)
*B23K 11/06*    (2006.01)
(Continued)

(52) U.S. Cl.
CPC ............ *B21C 37/08* (2013.01); *B23K 11/062* (2013.01); *B23K 13/01* (2013.01); *B23K 13/025* (2013.01)

(58) Field of Classification Search
CPC .... B23K 13/046; B23K 13/025; B23K 13/02; B23K 11/062; B23K 13/01; B21C 37/08
(Continued)

(56) References Cited

U.S. PATENT DOCUMENTS 2,818,489 A * 12/1957 Kalning et al. .............. 219/61.2
2,857,503 A * 10/1958 Rudd .................... B23K 13/043
                                                  219/60 A
(Continued)

FOREIGN PATENT DOCUMENTS

CN        201189526 Y      2/2009
EP        0613751 A1 *    9/1994 ........... B23K 13/025
(Continued)

OTHER PUBLICATIONS

Decision on Grant dated Aug. 12, 2013 in Russian Application 2012110053.
(Continued)

*Primary Examiner* — Tu B Hoang
*Assistant Examiner* — Alba T Rosario-Aponte
(74) *Attorney, Agent, or Firm* — Birch, Stewart, Kolasch & Birch, LLP

(57) ABSTRACT

In the electric-resistance-welded pipe welding apparatus, after a metal strip that is traveling is bent into a cylindrical shape by rolls so that both ends in a width direction of the metal strip face each other, a power supply portion of an induction heating device or an energization heating device is provided immediately near the metal strip which is bent into the cylindrical shape, a joule heating is performed with respect to the both ends by a power supplied from the power supply portion, thereafter, and the both ends are welded while being pressed to and coming in contact with each other. The electric-resistance-welded pipe welding apparatus includes a ferromagnetic body that is movably inserted between the both ends at a position further to the upstream than the power supply portion when viewed along the traveling direction of the metal strip, the position corresponding to an opening portion between the both ends which face each other.

14 Claims, 12 Drawing Sheets

(51) Int. Cl.
*B23K 13/01* (2006.01)
*B23K 13/02* (2006.01)

(58) Field of Classification Search
USPC ....... 219/636, 607, 59.1, 612, 613, 614, 617
See application file for complete search history.

(56) References Cited

U.S. PATENT DOCUMENTS

| | | | | | |
|---|---|---|---|---|---|
| 2,938,993 | A | * | 5/1960 | Rudd | 219/67 |
| 3,015,017 | A | * | 12/1961 | Rudd | B23K 13/046 |
| | | | | | 219/65 |
| 3,122,624 | A | * | 2/1964 | Domizi | 219/612 |
| 3,234,353 | A | * | 2/1966 | Inoue | 219/82 |
| 3,270,176 | A | * | 8/1966 | O'Neill et al. | 219/613 |
| 3,355,567 | A | * | 11/1967 | Worden et al. | 219/612 |
| 3,441,704 | A | * | 4/1969 | Abbott et al. | 219/613 |
| 3,511,957 | A | * | 5/1970 | Cannon et al. | 219/613 |
| 3,648,005 | A | * | 3/1972 | Rudd | 219/613 |
| 3,763,342 | A | * | 10/1973 | Oppenheimer | 219/61.2 |
| 4,197,441 | A | * | 4/1980 | Rudd | 219/612 |
| 4,246,464 | A | * | 1/1981 | Altstetter et al. | 219/123 |
| 4,268,736 | A | * | 5/1981 | Cuvelier | 219/613 |
| 4,694,134 | A | * | 9/1987 | Ross | 219/613 |
| 5,571,437 | A | * | 11/1996 | Rudd | 219/607 |
| 5,651,819 | A | * | 7/1997 | Krengel | B05C 3/12 |
| | | | | | 118/420 |
| 5,915,421 | A | | 6/1999 | Borzym et al. | |
| 2006/0131299 | A1 | | 6/2006 | Scott et al. | |
| 2008/0308550 | A1 | * | 12/2008 | Nemkov | 219/607 |
| 2012/0325805 | A1 | | 12/2012 | Hasegawa et al. | |

FOREIGN PATENT DOCUMENTS

| | | | |
|---|---|---|---|
| EP | 0613751 | A1 | 9/1994 |
| EP | 1413383 | A1 | 4/2004 |
| JP | 46-6339 | B1 | 2/1971 |
| JP | 53-44449 | A | 4/1978 |
| JP | 54-8539 | B2 | 4/1979 |
| JP | 56-39115 | A | 4/1981 |
| JP | 59-206180 | A | 11/1984 |
| JP | 63-97373 | A | 4/1988 |
| JP | 63-220977 | A | 9/1988 |
| JP | 01178380 | A * | 7/1989 ............. B23K 13/02 |
| JP | 4-23892 | U | 2/1992 |
| JP | 5-228650 | A | 9/1993 |
| JP | 5-261564 | A | 10/1993 |
| JP | 11-254027 | A | 9/1999 |
| JP | 2000-52059 | A | 2/2000 |
| JP | 2001-47252 | A | 2/2001 |
| JP | 2002-273576 | A | 9/2002 |
| JP | 2004-114101 | A | 4/2004 |
| RU | 599940 | A | 3/1978 |

OTHER PUBLICATIONS

Chinese Office Action and Search Report for Chinese Application No. 201080040860.8 dated Jan. 22, 2014, with English translation of the Search Report.
Japanese Notice of Allowance, dated Feb. 26, 2013, for Japanese Application No. 2011-206076.
"Fundamentals and Applications of High Frequency", Tokyo Denki University Press, Nov. 20, 1991, pp. 79-80 (5 pages provided with English translation).
International Search Report for Application No. PCT/JP2010/066014 dated Oct. 12, 2010 (with English translation).
Chinese Notice of Allowance and Search Report, dated Dec. 5, 2013, for Chinese Application No. 201080040803.X, including an English translation.
International Preliminary Report on Patentability and English translation of the Written Opinion of the International Searching Authority, dated Apr. 11, 2012, for International Application No. PCT/JP2010/065933 (Forms PCT/IB/373 and PCT/ISA/237).
International Preliminary Report on Patentability and English translation of the Written Opinion of the International Searching Authority, dated Apr. 11, 2012, for International Application No. PCT/JP2010/066014 (Forms PCT/IB/373 and PCT/ISA/237).
International Search Report, dated Dec. 14, 2010, for International Application No. PCT/JP2010/065933.
Russian Decision on Grant, dated Aug. 12, 2013, for Russian Application No. 2012109538, including an English translation.
U.S. Office Action, dated Apr. 23, 2014, for U.S. Appl. No. 13/395,788.
U.S. Office Action, dated Nov. 12, 2014, for U.S. Appl. No. 13/395,788.
Extended European Search Report for corresponding European Application No. 10817232.1, dated May 22, 2017.

* cited by examiner

FIG. 1    (Prior Art)
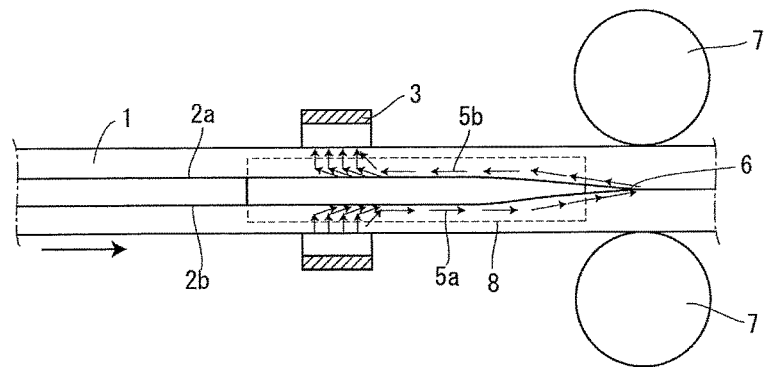
FIG. 2    (Prior Art)
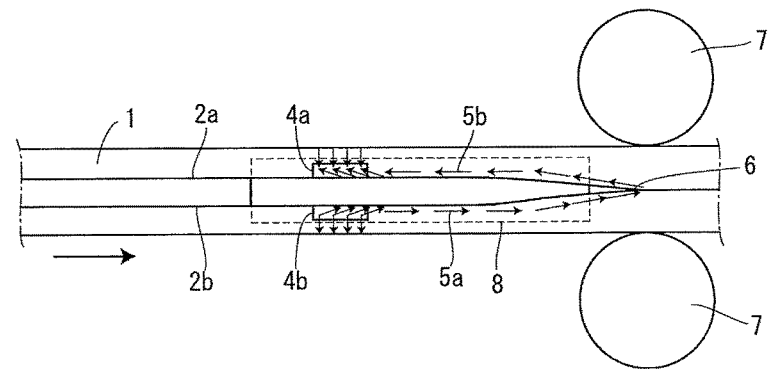

FIG. 3    (Prior Art)
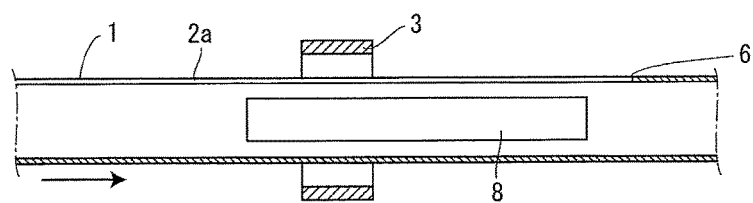
FIG. 4    (Prior Art)
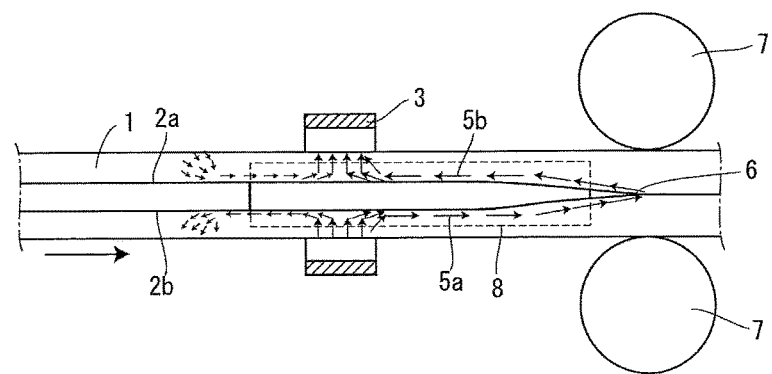

ELECTRIC-RESISTANCE-WELDED PIPE WELDING APPARATUS

BACKGROUND OF THE INVENTION

Field of the Invention

The present invention relates to an electric-resistance-welded pipe welding apparatus which bends a metal strip into a cylindrical shape while traveling the metal strip, joins both ends of the metal strip by energizing current through the metal strip with induction heating or direct energization of sliding electrodes, and manufactures an electric-resistance-welded pipe. More particularly, the present invention relates to an electric-resistance-welded pipe welding apparatus capable of welding with high efficiency by effectively eliminating reactive power.

Priority is claimed on Japanese Patent Application No. 2009-214885, filed Sep. 16, 2009 and Japanese Patent Application No. 2009-214887, filed Sep. 16, 2009, the content of which is incorporated herein by reference.

Description of Related Art

As methods for manufacturing a metal pipe, there is a method of manufacturing a seamless pipe by directly making hole into a metal billet, or a method of manufacturing a pipe by extruding a metal, in addition to a method of manufacturing an electric-resistance-welded pipe, a spiral pipe, or the like, in which a metal strip is bent and welded into a pipe shape.

Because of the particularly high productivity and the low cost, electric-resistance-welded pipes have been produced in large quantities. Such electric-resistance-welded pipes are molded into cylindrical shape while the metal strip is traveling, and finally, high frequency current flow is applied to both ends of the metal plate to be joined, so that the temperature of both ends are increased to the melting temperature, and the both end surfaces are press-welded by rolls, resulting in a pipe shape. At this time, as methods for supplying current to both ends of the metal strip, there is a method in which an induction coil is wound so as to surround the outside of the metal and the induction current are directly generated in the metal by making a primary current flow through the induction coil. As another method, there is a method in which metallic electrodes referred to as a "contact tip" are pushed against the ends of the metal strip and current flow directly from a power source to the metal strip. At this time, in many cases, as the current which flows through the conduction coil or the electrodes, high frequency current of 100 to 400 kHz are generally used and a ferromagnetic body referred to as an "impeder" is disposed on or above the inner surface of the pipe. The impeder is used to inhibit the current from flowing around the inner periphery of the metal strip which is just bent into a cylindrical shape.

CITATION LIST

Patent Documents

[Patent Document 1] Japanese Unexamined Patent Application, First Publication No. S53-44449

Non-Patent Documents

Non-Patent Document [1] "Fundamentals and Applications of High Frequency" (Pages 79 and 80, Tokyo Denki University Press)

SUMMARY OF THE INVENTION

Problems to be Solved

FIGS. 1 and 2 are schematic diagrams explaining a welding of an electric-resistance-welded pipe. A metal strip 1 which is a material to be welded, while being conveyed, is processed by rolls from a planar shape and molded into a cylindrical shape in which both ends 2a and 2b thereof face each other. In the last step, both ends 2a and 2b are pressed together by squeeze rolls 7 and come in contact with each other at a joint 6. In order to melt and join both ends 2a and 2b which face each other, at a position upstream from the squeeze rolls 7, an induction coil 3 is provided in an induction heating apparatus of FIG. 1, and electrodes 4a and 4b are provided in a direct energization apparatus of FIG. 2, as power supply portions. By making high frequency current flow using the induction coil 3, or the electrodes 4a and 4b in the direct energization apparatus, current 5a and 5b flows through the metal strip ends 2a and 2b, and generates joule heat, the surfaces of the metal strip ends 2a and 2b are heated and melted, and therefore, the surfaces are welded at the joint 6. The current 5a and 5b which are generated in the surface of the metal strip 1 and flows to the metal plate ends 2a and 2b are high frequency. If the metal strip 1 does not have the gap opening, the current should flow in a direction reverse of the primary current along the circumferential direction of the metal strip 1 at the position corresponding to the induction coil 3 or the electrodes 4a and 4b. However, in manufacture of the electric-resistance-welded pipe, since the metal strip has an opening, the current flows through the surfaces of the metal strip ends 2a and 2b due to a skin effect, and tends to flow along the metal plate ends due to a proximity effect.

If the circumferential length of the inner circumferential surface of the metal strip 1 which is bent into a cylindrical shape is sufficiently longer compared to a length in which current 5a and 5b go toward and return from the induction coil 3 or the electrodes 4a and 4b to the joint 6, since the impedance in the circumferential direction of the inner circumferential surface is larger compared to the impedance between the induction coil 3 or the electrodes 4a and 4b and the joint 6, the current are apt to flow through the joint along the metal strip ends as described above. However, in a case where the inner diameter of the cylindrical metal strip is smaller and the impedance in the circumferential direction of the inner circumferential surface of the cylindrical body is not as large, the current through the joint decreases and tend to flow through the inner circumferential surface of the pipe. In order to inhibit this current through the inner circumferential surface of the current, in the related art, as shown in the schematic cross-sectional view of FIG. 3, a method has been adopted in which a ferromagnetic body referred to as an "impeder 8" is inserted on or above the inner surface of the cylindrically shaped metal strip 1 in order to increase the impedance of the inner circumferential surface, and thereby the current flow around the inner circumferential surface is inhibited.

In Patent Document 1, a method is disclosed in which an impeder is disposed in the outer circumferential surface in addition to the impeder of the inner face. In the method disclosed in Patent Document 1, the impeder is disposed apparently in order to inhibit current flowing around the outer circumference of the bent cylindrical body. However, the inventors performed an electromagnetic field analysis based on the method described in Patent Document 1, and obtained a result. In the result, as indicated by current vectors of FIG. 4, the current flow along the circumferential direction of the outer circumferential surface of the cylindrical body are shown to be concentrated at the periphery just below the induction coil and at the portion upstream area apart from an end of the inner impeder of the metal strip 1 in the upstream direction of the induction coil. It became clear that the current along the outer periphery are extremely weak in the area from the induction coil to the impeder end. The outer surface impeder has an effect of cutting a part of the current flowing around the outer periphery. However, since the impeder itself is a ferromagnetic body, a function which carries the magnetic flux generated by the induction coil to a distance is generated, and wattless current are generated in the surface of the cylindrical metal. It became apparent that the welding efficiency decreases because of the aforementioned effects.

FIG. 1 shows a method of the manufacture of the electric-resistance-welded pipe in which a planar metal plate is bent by rolls while being carried and formed into a shape close to a cylinder, and both ends of the metal strip are heated and melted with induction current by the induction coil 3, and the ends come in contact with each other by the squeeze rolls 7 to be formed into a pipe. In such a method, in the structures disposed in the vicinity of the induction coil 3, such as the squeeze rolls 7, the roll stands contain a iron which is a magnetic material. Here, since the iron has high relative permeability and can easily collect the magnetic flux, the iron is heated by the magnetic flux generated by the induction coil 3, and extra power is consumed, causing a problem in that the welding efficiency decreases. Moreover, the squeeze rolls, the structure, and the like consume power and temperature thereof increase, requiring cooling.

In addition, a thermocouple was mounted on the metal strip ends and the temperature was measured. As a result, it was found that not only the metal strip ends by the joint 6 but also the metal plate the ends upstream of the induction coil 3 are heated when the current flows through the induction coil 3. In the related art, as shown in Non-Patent Document 1, it was explained that the current flows through only in the direction from just below the induction coil toward the welding portion. However, the inventors examined the current distribution and the magnetic field distribution by an electromagnetic field analysis of the electric-resistance-welded pipe, and found that the current distribution was not as shown in FIG. 1 of Non-Patent Document 1. That is, it was found that the current from just below the induction coil 3 flowed not only in the direction toward the joint 6, and a significant amount of the current was divided and flows toward a portion upstream of the induction coil 3. In addition, the magnetic flux was also dispersed in portions apart from the induction coil 3, and the induction current which does not contribute to the welding was also generated in the squeeze rolls 7 or the side surface portions other than the metal strip ends. That is, it became clear that there is a problem in that the power supplied by the induction coil 3 does not effectively flow through the joint and is consumed as wasted power.

The present invention solves the above-described problems and improves the heating efficiency during the manufacture of the electric-resistance-welded pipe, and an object thereof is to provide an electric-resistance-welded pipe welding apparatus capable of effectively enhancing production efficiency by a simple apparatus.

Aspects of the present invention are the following.

(1) According to an aspect of the present invention, an electric-resistance-welded pipe welding apparatus in which after a metal strip that is traveling is bent into a cylindrical shape by rolls so that both ends in a width direction of the metal strip face each other, a power supply portion of an induction heating device or an energization heating device is provided immediately near the metal strip which is bent into the cylindrical shape, a joule heating is performed with respect to the both ends by a power supplied from the power supply portion, thereafter, and the both ends are welded while being pressed to and coming in contact with each other, includes: a ferromagnetic body that is movably inserted between the both ends at a position further to the upstream than the power supply portion when viewed along the traveling direction of the metal strip, the position corresponding to an opening portion between the both ends which face each other.

(2) In the electric-resistance-welded pipe welding apparatus described in (1), the following configuration may be adopted. That is, the ferromagnetic body is movably inserted in a portion in the opening portion between the both ends, and includes a shape which covers one or both of an upper corner portion and a lower corner portion of each of the opposing both ends of the metal strip when viewed in a cross-section perpendicular to the traveling direction of the metal strip.

(3) In the case of the electric-resistance-welded pipe welding apparatus described in (2), the shape of the ferromagnetic body may be any one of a T shape, an inverted T shape, and an H shape when viewed at the cross-section.

(4) In the electric-resistance-welded pipe welding apparatus described in (1), a shape of the ferromagnetic body is an I shape when viewed in a cross-section perpendicular to the traveling direction of the metal strip.

(5) In the electric-resistance-welded pipe welding apparatus described in (1), a surface of the ferromagnetic body is coated with a material which is non-magnetic and non-conductive.

(6) In the electric-resistance-welded pipe welding apparatus described in (1), the welding apparatus may further include a moving mechanism that moves the ferromagnetic body so as to avoid a damage thereof in the opening portion between the both ends when the ferromagnetic body comes in contact with the both ends.

(7) In the electric-resistance-welded pipe welding apparatus described in (6), the moving mechanism may be a wire material that hangs and supports the ferromagnetic body.

(8) In the electric-resistance-welded pipe welding apparatus described in (6), the following configuration may be adopted. That is, a shape of the ferromagnetic body when viewed in a cross-section perpendicular to the traveling direction of the metal strip is a T shape or an H shape which includes a horizontal portion which is disposed in an upper portion of the ferromagnetic body and a vertical portion which is vertically extended downward from the horizontal portion, and the moving mechanism is an installation plate which includes an opening portion into which the vertical portion is inserted so that the vertical portion is positioned between the both ends, and a placement portion which is provided in a periphery of the opening portion and in which the horizontal portion is placed.

(9) In the electric-resistance-welded pipe welding apparatus described in (8), the following configuration may be adopted. That is, the welding apparatus further include a member that discharges a cooling medium on the upper portion of the ferromagnetic body, and a spacer that is interposed between the horizontal portion and the placement portion when the horizontal portion of the ferromagnetic body is placed on the placement portion of the installation plate, and a space through which the cooling medium passes is provided in the spacer so that the cooling medium moves down to the vertical portion of the ferromagnetic body when the cooling medium is discharged to the upper portion of the ferromagnetic body.

(10) In the electric-resistance-welded pipe welding apparatus described in (8), the following configuration may be adopted. That is, the welding apparatus further include a member that discharges a cooling medium to the upper portion of the ferromagnetic body, the ferromagnetic body includes slits which pass the cooling medium, and the cooling medium passes through the slits and moves down to the vertical portion when the cooling medium is discharged to the upper portion of the ferromagnetic body.

(11) In the electric-resistance-welded pipe welding apparatus described in (1), the following configuration may be adopted. That is, the power supply portion is an induction coil in the induction heating device, and a ring shaped ferromagnetic body disposed in an outer circumference of the induction coil is further provided.

(12) In the electric-resistance-welded pipe welding apparatus described in (11), the ring shaped ferromagnetic body may be divided into a plurality of sections along a circumferential direction of the induction coil.

(13) In the electric-resistance-welded pipe welding apparatus described in (12), a cooling channel to which the cooling medium flows is provided between the sections of the ring shaped ferromagnetic body which are adjacent.

(14) In the electric-resistance-welded pipe welding apparatus described in (1), the following configuration may be adopted. That is, the power supply portion is an induction coil which is included in the induction heating device, and a metallic shield plate which shields a magnetic flux generated by the induction coil is also provided in a portion further upstream than the ferromagnetic body in the traveling direction.

According to the electric-resistance-welded pipe welding apparatus described in (1), the welding efficiency of the electric-resistance-welded pipe, which forms the metal strip into a cylindrical shape while bending the traveling metal strip and welds it, can be effectively enhanced by a simple apparatus. Thereby, the electric power consumption can be decreased and energy conservation can be achieved.

Alternatively, in a case where the same power is input, since a line speed can be increased, improvement of productivity can be realized.

BRIEF DESCRIPTION OF THE DRAWINGS

FIG. 1 is a schematic plan view showing a current distribution based on idea of the related art using an induction coil.

FIG. 2 is a schematic plan view showing a current distribution based on the concept of the related art using sliding electrodes.

FIG. 3 is a schematic longitudinal cross-sectional view of the apparatus for manufacturing the electric-resistance-welded pipe shown in FIG. 1.

FIG. 4 is a schematic plan view showing a current distribution based on an electromagnetic field analysis.

DETAILED DESCRIPTION OF THE INVENTION

In pipe-forming of electric-resistance-welded pipe, a metal strip is slit so as to match the width for manufacturing the pipe, and is carried, is bent by rolls and formed into a cylindrical shape, so that both ends in the width direction of the metal strip face each other. Thereafter, current flows through the metal strip by an induction coil which is a power supply portion in an induction heating device or sliding energization electrodes which are power supply portion in an energization heating device, and the ends of the metal strip are heated and melted. Thereafter, in the downstream of the processing, the electric-resistance-welded pipe is obtained by pressing and sticking the opposing both end surfaces of the metal strip through squeeze rolls and joining (welding) them. Here, the "downstream" described in the present invention refers to the downstream in a traveling direction of the metal strip. Hereinafter, the "upstream" and the "downstream" indicate the "upstream" and the "downstream" in the traveling direction of the metal strip.

FIG. 1 is a schematic plan view showing an appearance of a joint when using an induction heating device and FIG. 2 is a schematic plan view showing an appearance of a joint when using an energization heating device, in which an impeder 8 is installed in the inner portion of the bent metal strip 1.

Hereinafter, for ease of the explanation, an embodiment of the present invention will be explained with reference with the drawings in the case of using the induction coil.

Figure 5:
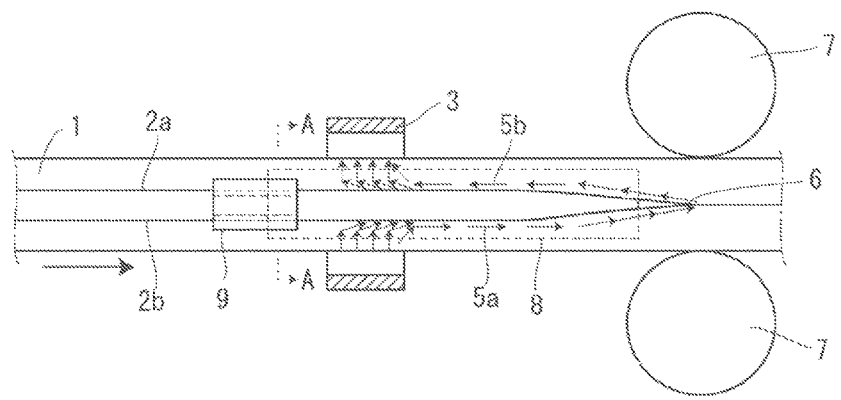
FIG. 5 is a schematic plan view explaining a current distribution when using an apparatus for manufacturing an electric-resistance-welded pipe according to an embodiment of the present invention.
Figure 6:
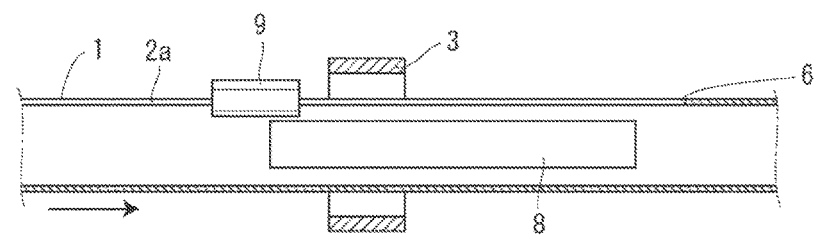
FIG. 6 is a schematic longitudinal cross-sectional view explaining the same apparatus for manufacturing the electric-resistance-welded pipe.

FIG. 5 is a schematic plan view showing an electric-resistance-welded pipe welding apparatus (an apparatus for manufacturing the electric-resistance-welded pipe) of the present invention by using the induction heating device and FIG. 6 is a schematic cross-sectional view thereof. In the explanation below, an example in which the induction heating device is used as the heating device and an induction coil 3 is used as the power supply portion of the induction heating device is described. The induction coil collectively refers to induction coils which wind around, by at least one round, a material to be heated using a pipe, a wire material, a plate or the like of a good conductor, such as copper, and the shape surrounding the material to be heated may be rectangular or circular and is particularly not limited. The induction coil 3 is provided in a corresponding position which is immediately near the metal strip which is bent into a cylindrical shape. Also in the case of using the energization heating device as shown in FIG. 2 as the heating device, the invention can be applied similarly to the case of using the induction heating device. In this case, the induction coil 3 in the explanation below may be replaced with electrodes 4 which are a power supply portion of the energization heating device.

The electrode resistance welded pipe welding apparatus of the present embodiment is characterized in that a ferromagnetic body 9 which is movably inserted between both ends 2a and 2b is disposed in a position which is to the portion upstream of the induction coil 3 supplying power when viewed along the traveling direction of the metal strip 1 and corresponds to a space (opening portion) between the opposing both ends 2a and 2b of the metal strip.

Hereinafter, the reasons why the ferromagnetic body 9 is disposed between the metal strip end 2a and the metal strip end 2b will be explained.

In the related art, as described in Non-Patent Document 1 or the like and as shown in FIG. 1 or FIG. 2, after current for the electric-resistance-welded pipe are from the induction coil or the electrodes toward a joint 6, the current returns toward the induction coil or the electrodes. However, the inventors attached a thermocouple on the metal strip ends of the upstream of the induction coil and measured the temperature, as a result, it was found that the area upstream of the induction coil 3 is also heated. Therefore, it was clear that the current flows through not only toward the joint 6 as shown in FIG. 1 but also the portion upstream of the induction coil. The inventors calculated a current distribution and a magnetic field distribution by performing an electromagnetic field analysis of the electric-resistance-welded pipe. As a result, it was found that the induction current generated in the metal strip 1 by the induction coil 3 are divided into current which returns toward the induction coil 3 after going toward the joint 6 which is welded and current (in the other end which is opposite to one end, the current are conversely returns) which are toward the upstream of the induction coil 3 as shown in FIG. 4.

Figure 8:
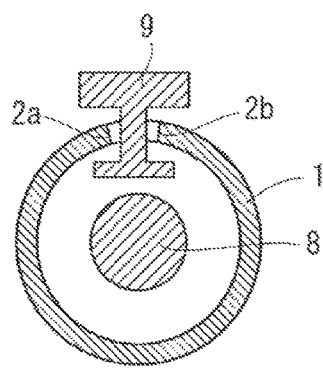
FIG. 8 is a schematic cross-sectional view showing an example in which an H-shape core is disposed between metal ends in the apparatus for manufacturing the electric-resistance-welded pipe.

Therefore, in order to suppress induction current from flowing to the portion upstream of the induction coil 3, it is considered that inhibiting current from flowing to the end surface the metal plate is effective. Therefore, in the present embodiment, the ferromagnetic body 9 is installed in a position corresponding to the opening portion between the opposing both ends 2a and 2b of the metal strip in the upstream in the traveling direction of the induction coil 3 which is the power supply portion. Thereby, when the welding of the electric-resistance-welded pipe by using the electric-resistance-welded pipe welding apparatus of the present invention, as shown in FIG. 8, between the metal plate ends 2a and 2b which face each other, the ferromagnetic body 9 is disposed so as to be movably inserted between both ends 2a and 2b. FIG. 8 is a cross-sectional view taken along a line A-A of FIG. 5.

If current flows, since the ferromagnetic body 9 operates so as to inhibit the current, the impedance increases and the current which flows through the portion upstream of the induction coil 3 are inhibited. Thereby, the current forms a distribution close to what is shown in FIG. 1 or FIG. 2.

Therefore, the current generated in the outer surface of the metal strip by induction can mostly flow toward the welding portion, and it is possible to increase the current density. In addition, a magnetic flux from the induction coil 3 can effectively flow through the impeder 8 by the ferromagnetic body 9. That is, the magnetic flux which is generated by the induction coil 3 intensively flows into the ferromagnetic body 9 having a small magnetic resistance. However, since the ferromagnetic body 9 is positioned just above the impeder 8, the current more easily flow through the impeder 8 as the distance between the ferromagnetic body and the impeder is smaller. In addition, the magnetic flux passes through the inner portion of the impeder 8 and get discharged from the impeder 8 placed downstream of the induction coil 3 to the opening portion of the metal strip. Therefore, since the magnetic field increases, the density of the current which flows through the welding portion is increased, and the welding efficiency can be further improved. Accordingly, compared to the case where the ferromagnetic body 9 is not installed, smaller power supply is required, energy conservation can be achieved, or the line speed can be increased even with the same input power. When the line speed is increased, the production rate can be improved.

Figure 7:
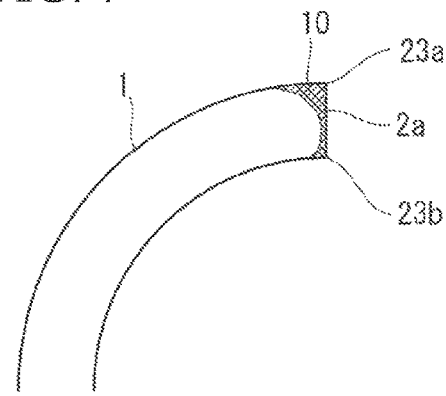
FIG. 7 is a schematic cross-sectional view explaining a distribution of current which flows in metal strip ends.

FIG. 7 is a schematic view of the pipe cross-section in the distribution of current which flows in metal plate ends. In the metal plate ends, a particularly large amount of the current flows in the upper and lower portions (corner portions), and it became clear that the more current flows in the upper corner portion 23a than in the lower corner portion 23b.

Thereby, it is more preferable that the ferromagnetic body 9 be installed so as to be movably inserted into both ends 2a and 2b at the position corresponding to the opening portion between both ends 2a and 2b of the opposing metal strip and include a shape which covers one or both of each upper corner portion 23a and each lower corner portion 23b in the opposing both ends of the metal strip when viewed at the cross-section perpendicular to the traveling direction of the metal strip 1.

A case where the ferromagnetic body 9 has an H shape and the H shape is turned sideways as shown in FIG. 8 can obtain the largest current suppressing effect. That is, since the current distribution is like shown in FIG. 7 in the metal plate ends, the current flows not only in the ends but also in the upper and lower surface areas in small amount. Therefore, in order to prevent the flow, it is preferable that the shape wraps not only the metal plate end surfaces but also the upper and lower surfaces while covering the edges of the metal plate, and the ferromagnetic body may be formed by curve surfaces as shown in FIG. 9.

Figure 9:
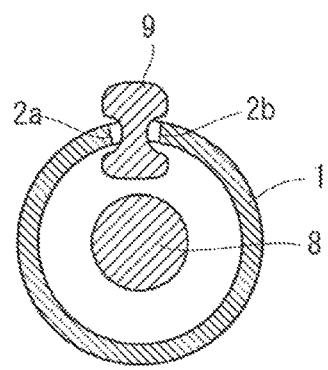
FIG. 9 is schematic cross-sectional view showing an example in which a curved H-shape ferromagnetic body is disposed between metal ends in the apparatus for manufacturing the electric-resistance-welded pipe.
Figure 10:
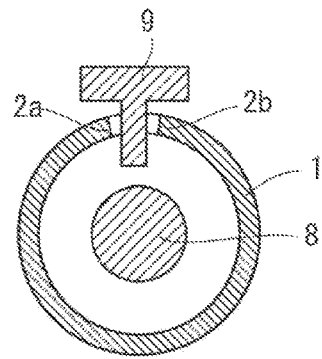
FIG. 10 is a schematic cross-sectional view showing an example in which a T-shape ferromagnetic body is disposed between metal ends in the apparatus for manufacturing the electric-resistance-welded pipe.
Figure 11:
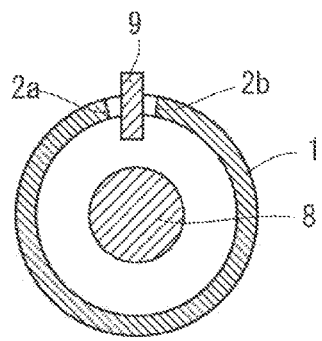
FIG. 11 is a schematic cross-sectional view showing an example in which an I-shape ferromagnetic body is disposed between metal ends in the apparatus for manufacturing the electric-resistance-welded pipe.
Figure 12:
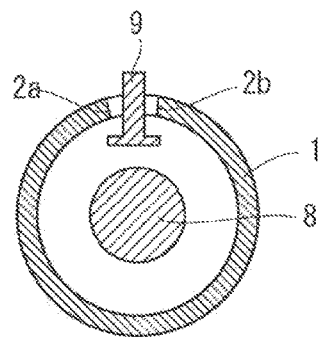
FIG. 12 is a schematic cross-sectional view showing an example in which an inverted T-shape ferromagnetic body is disposed between metal ends in the apparatus for manufacturing the electric-resistance-welded pipe.

Moreover, other than the shapes shown in FIG. 8 or FIG. 9, for example, the shape of the ferromagnetic body 9 may include a T shape shown in FIG. 10, an I shape shown in FIG. 11, or an inverted T shape shown in FIG. 12, and is not necessary to be linearly formed.

Moreover, although the detailed illustration is omitted, in FIGS. 8 to 12, a case for protecting the impeder 8 is provided in the periphery of the impeder 8 which is formed in a round bar shape. Thereby, for example, even though the ferromagnetic body having any one of the H shape shown in FIGS. 8 and 9, the T shape shown in FIG. 10, the I shape shown in FIG. 11, and the inverted T shape shown in FIG. 12 is used, the lower end of the ferromagnetic body 9 abuts the case of the impeder and serves as a stopper.

In addition, the example described in the present embodiment shows only the ferromagnetic body which is configured as a single piece. However, the invention is not limited thereto. For example, when the T shaped ferromagnetic body 9 shown in FIG. 10 is used, a concave receiving member may be disposed approximately downward of the vertical portion, that is, on the case (not shown) for protecting the impeder 8, and the vertical portion of the ferromagnetic body 9 may be configured so as to be inserted and supported into the concave portion of the receiving portion.

As the material of the ferromagnetic body 9, a good magnetic body having low conductivity such as ferrite or a electromagnetic steel sheet may be used.

In addition, although the position to install the ferromagnetic body 9 may be any portion further upstream than the induction coil, a position closer to the induction coil is more effective in order to inhibit the origin of the current that tends to flow. However, if the ferromagnetic body is too close to the induction coil, the density of the magnetic flux becomes high and the ferromagnetic body is easily heated. Therefore, it is preferable to appropriately determine the position in which such influence is not present. In addition, the length and the thickness of the ferromagnetic body 9 differ according to the use condition thereof and not particularly limited. However, as for the length, approximately several tens of millimeters is sufficient, and as for the thickness, a better effect can be obtained if the ferromagnetic body comes in proximity with the opening portion while not contacting with the metal strip.

Moreover, in the method for installing the ferromagnetic body 9, an effect of suppressing the current flow in the portion upstream of the induction coil 3 increases if the ferromagnetic body 9 is installed together with the impeder 8 that suppresses the current around the inner circumferential surface, so that the current does not flow around the inner circumferential surface from the metal plate ends to the inner periphery. That is, as shown in FIG. 6, it is preferable that the ferromagnetic body 9 be installed so above the impeder 8 between the portion upstream end of the impeder 8 and the induction coil 3.

In addition, the current suppressing effect is increased if a gap between the ferromagnetic body 9 and the metal plate ends is as narrow as possible, and the less effect is as the wider the gap is. Therefore, it is preferable that the ferromagnetic body and the metal plate ends are as close as possible to each other.

When the ferromagnetic body 9 is installed, in practice, the metal plate ends 2a and 2b might come in contact with the ferromagnetic body 9. Here, for example, if ferrite is used for the ferromagnetic body, the ferromagnetic body is easily cracked if an impact is applied thereto. When the ferromagnetic body formed of ferrite is cracked, equipment problems may easily occur in which, for example, the crack being bitten by the downstream squeeze rolls or being caught in the induction coil. Therefore, in the present invention, it is preferable to coat the outer surface of the ferromagnetic body 9 in consideration of safety and productivity in the apparatus. That is, it is preferable to coat the outer surface of the ferromagnetic body 9 with a glass tape or the like preventing scattering even when an impact is applied to the ferromagnetic body 9 and the ferromagnetic body is cracked.

As materials which coat the ferromagnetic body 9, any non-magnetic material or non-conductive material may be used. In addition to glass tape, molding with vinyl tape or resin having a heat-resistance may be used. Rubber or the like may also be attached. Although coating of the ferromagnetic body is not essential, coating is more preferable in the viewpoint of safe operation.

Moreover, in the installation of the ferromagnetic body 9, for example, when the positions of the metal plate ends are twisted and displaced during the traveling, if the ferromagnetic body 9 is installed in a fixed configuration, there is a considerable risk of the ferromagnetic body coming in contact with the metal plate ends and is cracked. Therefore, another embodiment of the present invention is characterized in that a moving mechanism is provided capable of moving the ferromagnetic body 9 so as to avoid damage thereof in the opening portion between both ends when the ferromagnetic body 9 comes in contact with both ends in the metal strip which is bent into a cylindrical shape during the traveling.

Figure 13:
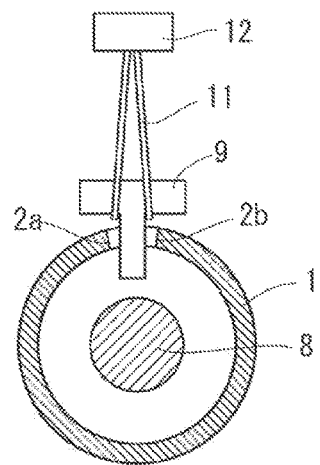
FIG. 13 is a schematic front cross-sectional view showing an example in which the T-shape ferromagnetic body is hung between metal ends by a thread so as to be freely movable in the apparatus for manufacturing the electric-resistance-welded pipe.
Figure 14:
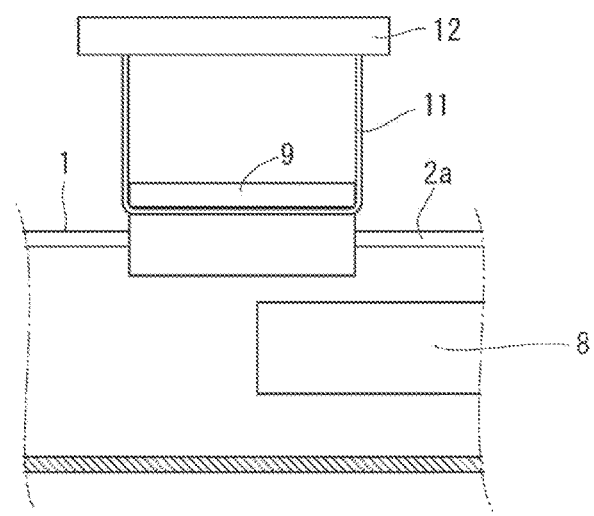
FIG. 14 is a schematic longitudinal cross-sectional view showing an example in which the T-shape ferromagnetic body is hung between metal ends by a thread so as to be freely movable in the apparatus for manufacturing the electric-resistance-welded pipe.

For example, FIG. 13 is an example in which the ferromagnetic body 9 is hung and supported to a fixing plate 12 by a thread 11 formed of a wire material such as alumina fiber, and FIG. 14 is a cross-sectional view thereof when viewed from the front. In the examples shown in FIGS. 13 and 14, since the ferromagnetic body 9 is hung by the thread 11, the ferromagnetic body 9 is separated so as to escape from the metal plate end even if the metal plate ends comes in contact with the ferromagnetic body 9. Therefore, the ferromagnetic body is not easily damaged.

In addition, as the moving mechanism capable of moving, when the ferromagnetic body is a T shape or an H shape, the following mechanism can be adopted. Two installation plates for the ferromagnetic body are horizontally provided in a position between the upper horizontal portion of the ferromagnetic body and the metal strip bent into a cylindrical shape. The two installation plates are opposite to each other interposing and separated from the vertical portion of the ferromagnetic body. The upper horizontal portion of the ferromagnetic body is placed on the installation plates.

Figure 15:
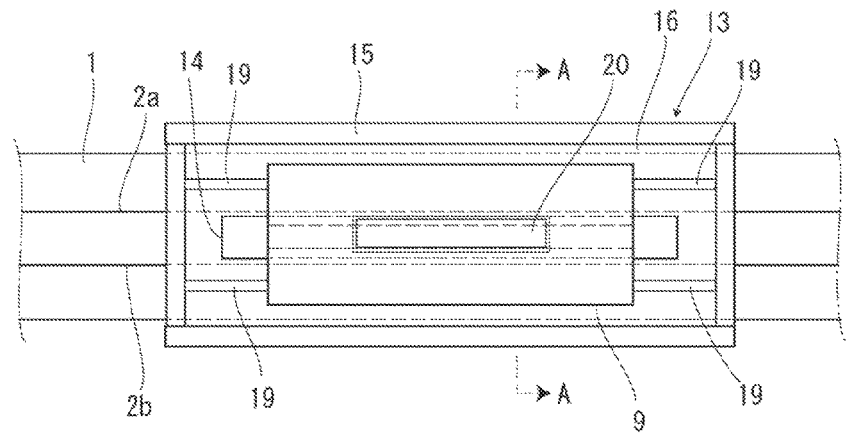
FIG. 15 is a schematic plan view explaining an example of a case for a ferromagnetic body according to an embodiment of the present invention, in which a ferromagnetic body can be installed so as to be freely movable.
Figure 16:
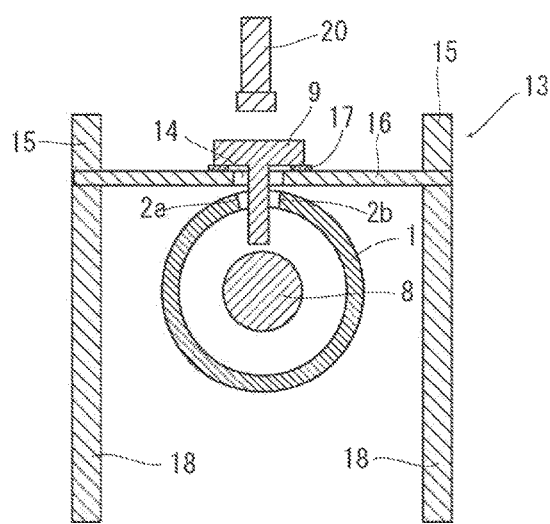
FIG. 16 is a schematic front cross-sectional view explaining a structure which can effectively cool the ferromagnetic body when viewed along an A-A cross-section of FIG. 15.

FIGS. 15 and 16 are an example in which the ferromagnetic body 9 is installed through spacers 17 on a bottom plate (installation plate) 16 of an installation base 13, in which an opening portion 14 is provided so that the ferromagnetic body 9 is freely moveable. Here, the bottom plate 16 includes the opening portion 14 and a placement portion provided on the periphery of the opening portion 14. The vertical portion of the ferromagnetic body 9 is inserted into the opening portion 14 so that the vertical portion is positioned between both ends 2a and 2b. The horizontal portion is placed on the placement portion. In the above explained configuration, the ferromagnetic body 9 can freely move in the space of the opening portion 14. The ferromagnetic body 9 moves not only in the traveling direction or the width direction of the metal strip but also may vertically move when it reached at the welding portion connecting the metal strip. In general, since the ferromagnetic body 9 has an appropriate weight, the ferromagnetic body does not move significantly unless a large force is applied. However, in order to stabilize the position of the ferromagnetic body 9, as shown in FIG. 15, for example, the apparatus of the present invention may be configured using a flexible structure 19 formed of materials having a flexibility such as rubber or sponge so as to restore the position of the ferromagnetic body 9 in the planar surface. The apparatus may also be configured so that the rear surface of the ferromagnetic body 9 is lightly pressed by rubber, resin, or the like in order to prevent the ferromagnetic body from jumping out of the case.

FIG. 16 is a cross-sectional view along a line A-A of FIG. 15 and is an example in which the installation base 13 is provided on fixed legs 18. In the shown example, the spacers 17 are provided between the ferromagnetic body 9 and the bottom plate 16. However, the spacers are not necessarily essential. However, as described above, because the ferromagnetic body 9 is easily heated under a strong magnetic field, it is preferable to cool the ferromagnetic body. Therefore, adopting the above-explained configuration is effective in order to cooling the ferromagnetic body. That is, cooling medium such as water is sprayed onto the ferromagnetic body 9 from a cooling nozzle (a member that discharges the cooling medium) 20 provided above the ferromagnetic body 9, so that the upper surface of the ferromagnetic body 9 is cooled. In addition, the spacers 17 are provided at a plurality of places with intervals, in the lower portion of the ferromagnetic body 9. Thereby, a gap is placed between the ferromagnetic body 9 and the bottom plate 16, and the cooling medium moves down toward the lower surface and the vertical portion of the ferromagnetic body 9, and cools them. Therefore, it is possible to effectively cool the entire ferromagnetic body 9. At this time, if cooling water is sufficiently supplied into a region surrounded by an enclosure 15, large amounts of cooling water can be supplied to the impeder case (not shown) from the opening portion other than the ferromagnetic body 9. Therefore, it is possible to prevent scales or the like which are brought by the metal plate from depositing in the impeder case.

The spacers 17 may be provided on a fixing board (bottom plate 16) or be mounted on the ferromagnetic body 9. Moreover, as the material of the spacers 17, it is preferable to adopt a material which is not subjected to electric induction, for example, resin such as epoxy or Bakelite.

In the explanation of the embodiment, the case where the metal strip 1 is welded by using the induction coil 3 is described. However, as shown in FIG. 2, the same principle is also applied to the case where the welding is performed by using the electrodes 4, and the ferromagnetic body 9 is effective for inhibiting the current from flowing to the portion upstream of the electrodes. In addition, in a case where the length in the circumferential direction in the inner circumferential surface of the metal strip which is bent into a cylindrical shape is far longer than the distance which goes and returns between the induction coil 3 and the joint 6 and the impedance is large, the impeder may not be used. Also, in the case where the impeder is not present, the invention can obtain the effect which effectively directs current toward the joint.

Figure 17:
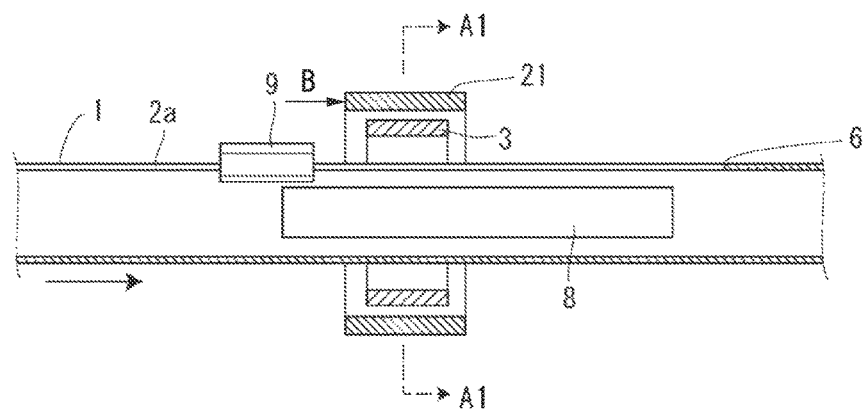
FIG. 17 is a longitudinal cross-sectional view explaining an example in which a ring shaped ferromagnetic body is installed in the outer surface of the induction coil of the apparatus for manufacturing the electric-resistance-welded pipe according to an embodiment of the present invention shown in FIG. 6.
Figure 18:
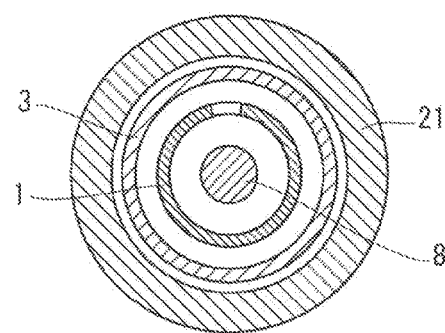
FIG. 18 is a front cross-sectional view when viewed from an arrow A1-A1 of FIG. 17 as a view showing the apparatus for manufacturing the electric-resistance-welded pipe.

In order to further enhance the welding efficiency, in another embodiment of the present invention, a ring shaped ferromagnetic body is disposed close to the outer circumference of the induction coil which is a power supply portion when using the induction heating device. FIG. 17 is a schematic cross-sectional view showing the configuration, and FIG. 18 is a schematic view showing a cross-section along a line A1-A1 in the vicinity of the conduction coil 3 of FIG. 17. As shown in FIGS. 17 and 18, in the present embodiment, a ring shaped ferromagnetic body 21 is provided along the outer circumference of the induction coil 3 in the vicinity of the outside of the induction coil 3. As the material of the ferromagnetic body 21, ferrite, a laminated electromagnetic steel sheet, amorphous alloy, or the like may be used.

In the case where the ferromagnetic body 21 is not provided, the magnetic flux generated by primary current flow in the induction coil 3 passes through the rolls or structures disposed in the periphery, and the power is wastefully used. However, when the ring shaped ferromagnetic body 21 is provided in the vicinity of the induction coil 3, it is possible to prevent the power waste from occurring. Moreover, in the present invention, in the case where the ring shaped ferromagnetic body 21 is disposed in the vicinity of the outer peripheral of the induction coil 3, the ferromagnetic body 21 is disposed so as to surround the induction coil 3 in the outer peripheral of the induction coil 3, using ferrite formed in a disk shape and has a thickness, a thin electromagnetic steel laminated in a rectangular parallelepiped or a fan shape, amorphous, or the like.

The ferromagnetic body 21 has characteristics in that its permeability is several times higher than that of the metal strip 1, rolls, or structure thereof. Because of this characteristics, the ferromagnetic body 21 prevents diffusion of the magnetic flux from the induction coil 3, introduces the magnetic flux generated by the induction coil 3 to the ferromagnetic body 21 having small magnetic resistance, and concentrates the magnetic flux in the vicinity of the induction coil 3. Therefore, if the magnetic flux is concentrated in the vicinity of the induction coil 3, thereby, the current generated in the metal strip 1 increases, the density of the current which flows in the metal plate end increases, and the heating efficiency improves.

Particularly, in the case where the ferromagnetic body 9 is disposed in the upstream of the induction coil 3, the magnetic flux is biased to the downstream of the induction coil 3. Therefore, controlling the magnetic flux toward the squeeze rolls or the like is important in order to improve the welding efficiency.

If the magnetic flux generated by the induction coil is concentrated just below the induction coil, the magnetic flux passing through the inner space of the cylindrical body formed by the metal strip 1 increases, and the induction current generated in the metal strip 1 increases. Therefore, the current toward the joint 6 to be welded can be increased. In the present embodiment, the ferromagnetic body 21 having a large relative permeability and a small magnetic resistance is disposed along the outer circumference in the outer peripheral of the induction coil 3. Since the magnetic flux generated by the induction coil 3 selectively passes inside the ferromagnetic body 21, diffusion of the magnetic flux is prevented, and the magnetic flux can be concentrated just below the induction coil 3. Thereby, it is possible to prevent the magnetic flux generated by the induction coil 3 from flowing to metals such as the squeeze rolls or the frame.

That is, compared to the squeeze rolls or the frame formed of iron having relative permeability of approximately several hundred, the ferromagnetic body 21 formed of a ferromagnetic material such as a ferrite core, electromagnetic steel, or amorphous having several times larger relative permeability. The ferromagnetic body 21 is disposed along the outer circumference of the induction coil and the vicinity of the induction coil 3, so that the magnetic flux generated in the induction coil 3 selectively passes inside the ferromagnetic body 21. Thereby, diffusion of the magnetic flux is prevented, and the magnetic flux can be concentrated just below the induction coil 3. If the magnetic flux is concentrated just below the induction coil 3, the current which flows around the metal strip just below the induction coil 3 increases, the density of the current which flows around the surface of the metal strip ends and moves toward the joint increases, and the welding having improved efficiency can be performed. At this time, it is preferable that a conductor from the induction coil toward a power source be led to the portion upstream in the traveling direction of the cylindrical body.

Figure 19:
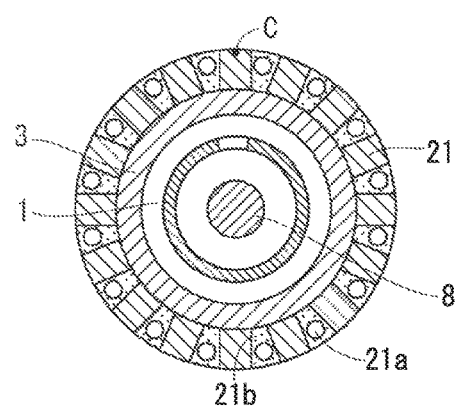
FIG. 19 is a schematic cross-sectional view of an induction coil including divided ferromagnetic bodies and cooling member in the apparatus for manufacturing the electric-resistance-welded pipe according to an embodiment of the present invention.

In addition, if the present embodiment adopts a configuration in which the ferromagnetic body is disposed so as to be divided into a plurality of sections in the circumferential direction of the induction coil, for example, when a magnetic material core (ferromagnetic body 21) in which foils such as a electromagnetic steel or amorphous are laminated is manufactured, as shown in a cross-section view of FIG. 19, if the ferromagnetic bodies are not laminated so as to be approximately perpendicular to the induction coil, the magnetic flux penetrates the surface of the magnetic material core and heats it. Therefore, not only that power loss occurs, but also there is a problem in that the function as the magnetic material core is lost. Thereby, as shown in FIG. 19, it is necessary that the lamination direction of the material configuring the magnetic material core is approximately perpendicular to the induction coil. However, it is difficult to continuously laminate the material configuring the magnetic material core in the circumferential direction since a difference between the inner circumference and the outer circumference is generated when laminating. Therefore, it is easier to use a regular magnetic material core laminated in a rectangular cross-sectional shape and divided it in the circumferential direction to be disposed. In addition, when the magnetic material core is divided in the circumferential direction and disposed, the function can be maintained over an extended period since the heated magnetic material core is easily cooled. Moreover, since the magnetic flux which leaked to the outside of the magnetic material core can be substantially prevented when the cooling plate is manufactured of cooper or the like, advantages such as preventing heating of the peripheral equipment or the like can be obtained.

The ferromagnetic body 21 is easily heated since the ferromagnetic body is disposed close to the induction coil 3 and subjected to a strong magnetic field. Therefore, in the present embodiment, it is more preferable that the ferromagnetic body 21 disposed around the induction coil 3 be disposed so as to be divided in the vicinity of the induction coil 3, and a member to cool the ferromagnetic body 3 be provided. FIG. 19 is a cross-sectional view showing an example thereof, and the following structure may be provided. That is, cooling plates 21*b* formed of a cooper plate or the like are provided between ferromagnetic bodies 21 which are divided in a plurality of sections along the circumferential direction and adjacent to each other, and cooling channels 21*a* through which the cooling medium flows are provided by making holes in the cooling plates 21*b*. At this time, it is preferable that the cooling plates 21*b* are adhered to the ferromagnetic bodies 21 by adhesives having a good thermal conductivity and an insulation property, or the like. In this way, if the cooling plates 21*b* are provided so as to be adhered to the ferromagnetic bodies 21, the heat, which is generated when the ferromagnetic bodies 21 are heated by the magnetic flux generated through high frequency current, can be effectively removed by the cooling medium passing the cooling channels 21*a*, magnetic characteristics of the ferromagnetic bodies is not damaged, and the ferromagnetic bodies can be stably used without problems such as a burnout.

Figure 20:
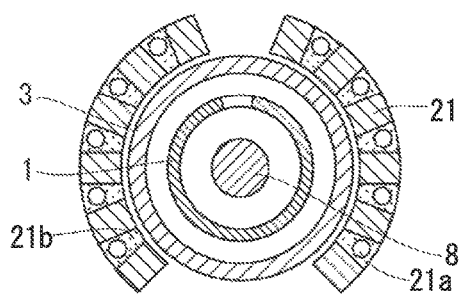
FIG. 20 a schematic cross-sectional view which includes an induction coil having a ferromagnetic body and cooling member which are partially removed in the circumferential direction of the induction coil in the apparatus for manufacturing the electric-resistance-welded pipe according to an embodiment of the present invention.

In addition, it is preferable that the ferromagnetic bodies 21 are disposed around it so as to cover the entire induction coil 3. However, when obstacles such as a lead portion toward the power source or a frame are close to the ferromagnetic bodies, or the like, in order to avoid the interference, as shown in FIG. 20, the ferromagnetic bodies may be disposed so as to be thinned out (partially removed) in the middle of the circumference. In the divided structure shown in FIG. 20, the magnetic material core (ferromagnetic bodies 21) is disposed in the outer peripheral of the opening portion rather than in the opening portion of the metal strip. In this case, the magnetic flux generated by the induction coil does not intensively directly enter the impeder 8 just below the opening portion of the metal strip 1. Accordingly, the burnout of the impeder 8 can be prevented. That is, the magnetic flux generated by the induction coil 3 disposed on the opening portion of the metal strip 1, flows toward the ferromagnetic bodies 21 by disposing the ferromagnetic bodies 21 having a small magnetic resistance on the outside of both ends of the opening portion of the metal strip 1. Therefore, the ratio of the magnetic flux which directly flows to the impeder 8 can be decreased, and burnout of the impeder 8 can be prevented.

Moreover, when the ferromagnetic bodies 21 are intensively disposed only on the periphery of the opening portion across both ends of the opening portion of the metal strip 1 (for example, when ferromagnetic bodies 21 are disposed only in the upper half portion of the induction coil 3 in the vertical direction while having a length equal to or less than a semicircle), since the magnetic flux generated by the induction coil passes through the ferromagnetic bodies 21 and intensively flows into the impeder 8, burnout of the impeder 8 is easily generated. Thereby, it is preferable that the ferromagnetic bodies 21 are disposed over the lower half of the induction coil 3 in the vertical direction.

Figure 21:
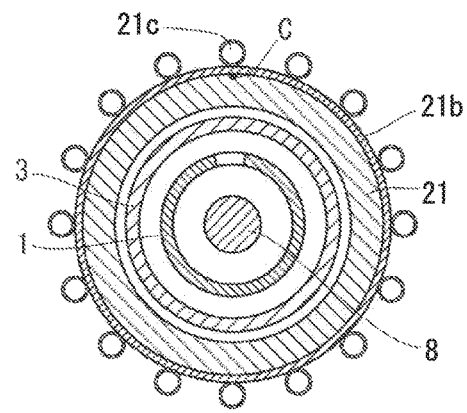
FIG. 21 is a schematic front cross-sectional view explaining an example in which a cooling structure is provided in the outer circumferential portion of the ferromagnetic body shown in FIG. 18 in the apparatus for manufacturing the electric-resistance-welded pipe according to an embodiment of the present invention.

FIG. 21 is an embodiment showing another cooling structure, and the following structure may be provided. That is, a cooling plate 21b having a low resistance and a high thermal conductivity, such as a copper plate, may be wound and adhered onto the ring shaped ferromagnetic body 21 of the configuration of FIG. 18. Cooling pipes 21c such as a copper pipe through which the cooling medium passes may be mounted on the cooling plates 21b by a brazing or the like.

Figure 22:
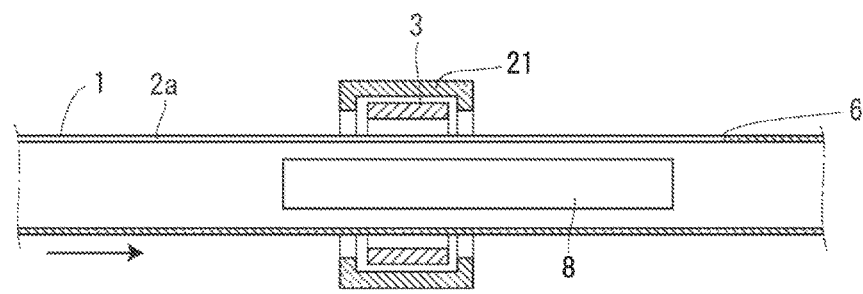
FIG. 22 is a longitudinal cross-sectional view showing an example in which the ends of the ferromagnetic body disposed in the outer peripheral of the induction coil faces toward the metal strip in the apparatus for manufacturing the electric-resistance-welded pipe according to an embodiment of the present invention.

A width in the longitudinal direction of the ferromagnetic body 21 may be narrower than a width of the induction coil 3. However, as shown in FIG. 17, it is preferable that the width of the ferromagnetic body be slightly further protruded in the upstream direction and in the downstream direction than the width of the induction coil 3 (about 10 to 20 mm). If the width in the longitudinal direction of the ferromagnetic body 21 is too much wider than that of the induction coil 3, disadvantages occur such as a form in which the magnetic flux is supplied to other devices such as the squeeze rolls 6, and the like. Therefore, as shown in FIG. 22, the end surfaces in a small portion of the ferromagnetic body 21 may be configured so as to face toward the metal strip 1. However, caution should be taken in that if the surfaces of the ferromagnetic body 21 are too close to the metal strip 1, since the influence of the magnetic flux penetrating the thickness direction of the metal strip 1 is too large, a close loop is formed just below the ferromagnetic body 21, and the current passing through the joint 6 may decrease. Moreover, as long as the thickness of the ferromagnetic body 21 is set so that the ferromagnetic body does not reach magnetic flux saturation. The thickness may be appropriately designed, according to a saturation magnetic flux density of the used material, the frequency, power, or the like.

Moreover, the distance between the induction coil and the ferromagnetic body is not particularly defined. However, since it is necessary to interpose an insulator between the induction coil and the ferromagnetic body, it is necessary that a gap of approximately several millimeters exists. However, if the distance between the induction coil and the ferromagnetic body is too large, since a concentration effect of the magnetic flux is weakened, it is preferable that the induction coil and the ferromagnetic body are disposed in a range of 20 to 30 mm or less.

Figure 23:
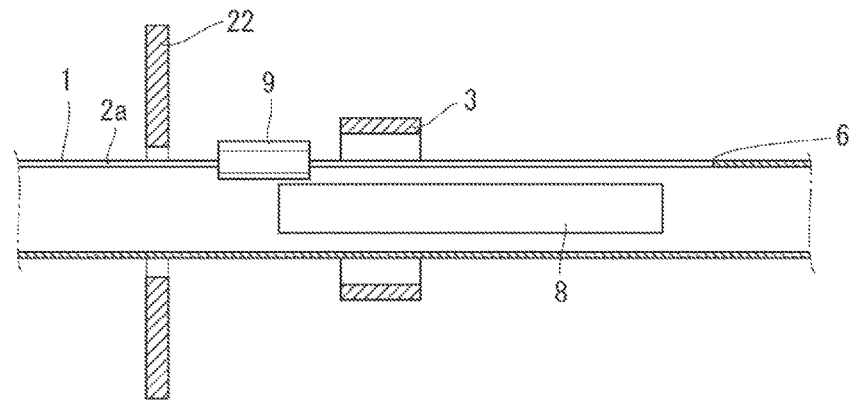
FIG. 23 is a longitudinal cross-sectional view explaining an example in which a shield plate is installed upstream of the ferromagnetic body, which is installed upstream of the conduction coil, in the apparatus for manufacturing the electric-resistance-welded pipe according to an embodiment of the present invention.

Further, in order to prevent current from flowing to the upstream of the induction coil 3, as still another embodiment according to the present invention, it is effective to install a shield plate 22 further upstream than the ferromagnetic body 9 as shown in FIG. 23. That is, when the current which was not stopped by the ferromagnetic body 9 flows further upward than the ferromagnetic body 9, the magnetic flux also reaches farther. Accordingly, the magnetic flux may be cut by installing the shield plate 22, it is possible to prevent the current from flowing further upstream than the shield plate 22. Therefore, it is possible to prevent rolls or the like from being damaged.

As the shield plate 20, materials which have a shield effect as metals having a low resistance such as a copper plate or an aluminum plate may be used. As for the shape of the shield plate, it is preferable to provide an opening portion not too large while having a gap as an extent that does not contact the metal strip 1. In addition, the external shape of the shield plate 20 is not particularly defined and may be a circle or a quadrilateral. However, it is preferable to provide the external shape which has at least a larger area than an outer diameter of the induction coil 3 and is larger than that of the roll or the cover to be protected.

In the above description, the case where the induction coil is used is explained as the example. However, the effect of installation of the shield plate 20 is effective even in the configuration which is directly energized from the electrodes. That is, even in the case of the direct energization, in the current which flows toward the upstream from the electrodes, since the impedance becomes lower when the current flows in the both end surfaces of the metal strip in mutually reverse directions, the current intensively flow in the both end surfaces of the metal strip. Therefore, as described above, by providing the ferromagnetic body between the both end surfaces of the metal strip, the current may be prevented from flowing to the portion further upstream than the electrodes, and the current flow toward the welding portion can be effectively increased.

Next, still another embodiment of the present invention will be explained below with reference to FIGS. 24 to 26.

Figure 24:
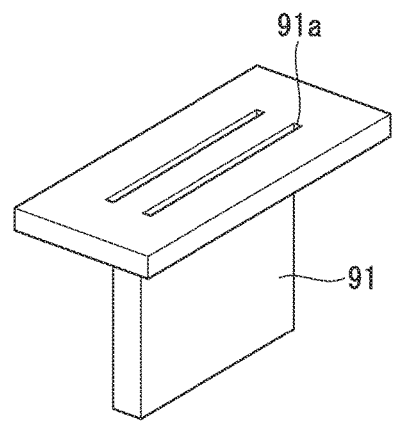
FIG. 24 is a schematic perspective view showing an example of a ferromagnetic body in which slits are provided in the apparatus for manufacturing the electric-resistance-welded pipe according to an embodiment of the present invention.

First, FIG. 24 shows an example in which gaps 91a are provided on the upper portion of the vertical portion of a T-shaped ferromagnetic body 91. As shown in FIG. 1, the reason the gaps are provided on the upper portion of the vertical portion of the ferromagnetic body is that current is stably prevented over a long time from flowing in the portion upstream of the induction coil by preventing the heating of the magnetic material core disposed on the opening portion of the metal strip. That is, since the ferromagnetic body of the present invention is movably inserted between the metal strip ends, current which has a direction reverse to the high frequency current flowing in the metal strip ends flows in the inner portion of the ferromagnetic body so as to inhibit the high frequency current from flowing in the metal strip ends. As a result, the ferromagnetic body is heated. In this way, if the ferromagnetic body is heated and has a high temperature, the magnetism is gradually lost, and the ferromagnetic body becomes incapable of inhibiting the current from flowing in the portion upstream of the induction coil. Thereby, in the example shown in FIG. 24, the slits 91a are provided in order to effectively cool the ferromagnetic body 91 which is heated, the ferromagnetic body 91 is cooled through a direct cell manner by passing the cooling medium through the slits 91a. As the cooling medium which is used at this time, for example, cooling water, water with suspended oil, gas such as air, mist, or the like may be appropriately adopted. In this case, for example, when the above-described cooling medium is discharged to the upper portion of the ferromagnetic body 91 from the member that discharges the cooling medium provided on the upper portion of the ferromagnetic body 91, the cooling medium passes through the slits 91a and moves down to the vertical portion.

Figure 25:
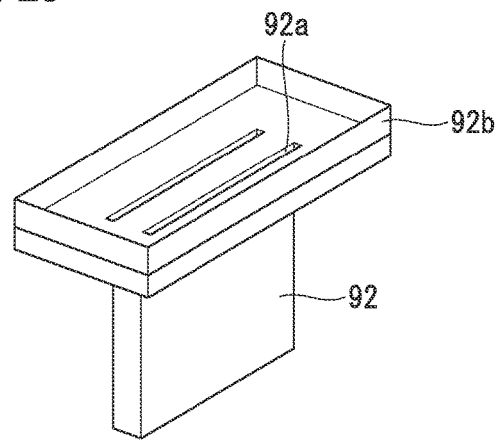
FIG. 25 is a schematic perspective view showing an example of a ferromagnetic body in which slits and a peripheral wall portion are provided in the apparatus for manufacturing the electric-resistance-welded pipe.
Figure 26:
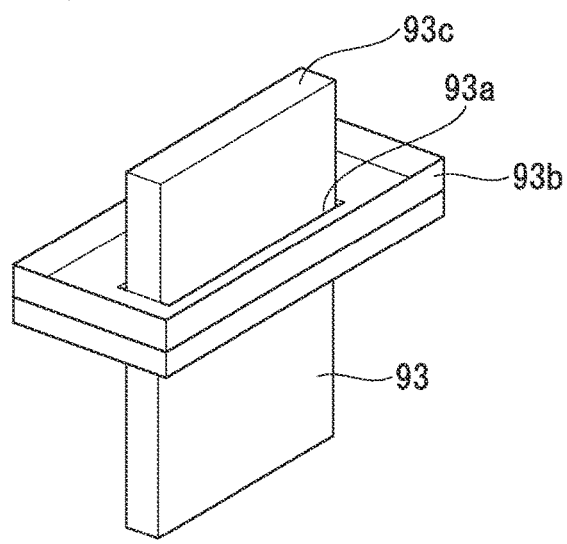
FIG. 26 is a schematic perspective view showing an example of a ferromagnetic body in which a protrusion is provided in addition to slits and a peripheral wall portion in the apparatus for manufacturing the electric-resistance-welded pipe.

The ferromagnetic body 92 exemplified in FIG. 25 is a configuration in which a peripheral wall portion 92b is further provided on the magnetic material of the horizontal portion (upper portion of T shape). Since the ferromagnetic body 92 exemplified in FIG. 25 temporarily stores the cooling medium supplied from the upper portion in an inner space surrounded by the peripheral wall portion, it is also possible to effectively cool the horizontal portion.

Moreover, FIGS. 24 and 25 show the example of a so-called T shape in which the vertical portion of the ferromagnetic body is disposed at the lower portion of the horizontal portion. However, like a ferromagnetic body 93 exemplified in FIG. 26, a configuration including a protrusion 93c in which the vertical portion protrudes above from the horizontal portion, that is, a configuration like the shape in which the T shape and the inverted T shape are combined with each other may be adopted.

As described above, in the electric-resistance-welded pipe welding apparatus according to the present invention compared to the related art, since power consumption can be decreased, energy conservation is possible. In addition, a production is possible in which the line speed can be increased with the same power. The increase of the line speed improves not only the productivity but also stabilizes the weld quality.

Moreover, damage to rolls due to the current which flows through the portion upstream of the induction coil or the electrodes can be prevented. In addition, the heating to the structures disposed in the periphery of the induction coil due to the leaked magnetic flux can also be prevented. And therefore, improved electric-resistance-welded pipe welding apparatus including characteristics capable of performing safe operation of the equipment or the like is provided.

Hereinafter, the invention will be explained based on Experiments. However, the invention is not limited only to the following examples.

EXPERIMENTS

Experiment 1

In order to confirm the effects of the present invention, confirmation tests were performed as described below.

In Experiment 1, a parallel opening portion having a width of 10 mm was formed in a steel pipe for a gas pipe having the outer diameter of 38 mm and the thickness of 3 mm. Thereafter, an inclined portion up to the joint 6 is laser processed to have an angle of 3°, so that the joint 6 imitates the welding portion. With an installation shown in FIG. 5, it was confirmed how the heating rate of the steel pipe ends changes according to whether or not the ferromagnetic body was present and the shape of the ferromagnetic body.

Figure 27:
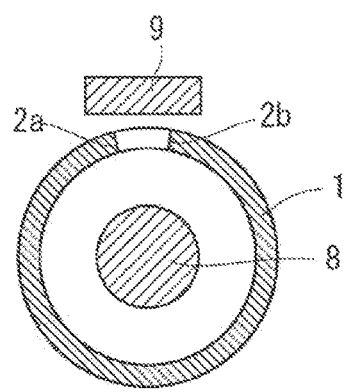
FIG. 27 is a schematic cross-sectional view showing a shape of a ferrite core which is used as Comparative Example.

In the tests of the Experiment 1, as the ferromagnetic body 9 shown in FIG. 8, Experiment 1 according to the present invention in which the shape of the ferrite core was formed to the shape where the H shape is turned sideways and the ferrite core was provided, Inventive Example 2 in which the ferrite core having the T shape as shown in FIG. 10 was used, and Inventive Example 3 in which the ferrite core having the I shape as shown in FIG. 11 was used were used respectively. Moreover, in the tests, as the comparative examples, Comparative Example 1 in which the ferrite core was not provided and Comparative Example 2 in which only the horizontal portion in the ferromagnetic body (ferrite core) shown in FIG. 8 or FIG. 10 was used and the ferrite core of the shape as shown in FIG. 27 was used were used, and average heating rates at the joint 6 from room temperature to 1000° C. were measured with respect to Comparative Example 1 and Comparative Example 2 respectively.

The ferrite used in the tests was common in Inventive Examples and Comparative Examples, the horizontal portion had the width of 48 mm, the height of 16 mm, and the length of 60 mm in the longitudinal direction, and the ferrite entering between the open metal ends had the width of 8 mm, the height of 16 mm, the length of 60 mm. The core of the lower horizontal portion shown in FIG. 8 had the width of 16 mm, the height of 8 mm, and the length of 60 mm.

As the induction coil, a water-cooled copper tube having a diameter of 10 mm wound by two turns was disposed so as to be separated by 150 mm from the joint with a gap of 5 mm from the steel pipe. In addition, power of 15 kW was input with a power source of 200 kHz in a resting state, and times until the highest temperature is 1000° C. were measured. The temperatures at this time were measured by welding a 50 μm K thermocouple to the steel pipe ends. In addition, a core made of ferrite having the diameter of 16 mm and the length of 300 mm was used as the impeder, in which a hole of 6 mm is formed in the center.

The results are shown in Table 1.

TABLE 1

|  |  | Improvement Percentage of Heating Rate | Heating in Upstream of Induction Coil |
|---|---|---|---|
| Inventive Examples | Inventive Example 1 | 21 | 2 |
|  | Inventive Example 2 | 17 | 7 |
|  | Inventive Example 3 | 9 | 65 |
| Comparative Examples | Comparative Example 1 | 0 | 350 |
|  | Comparative Example 2 | 2 | 346 |

An improvement percentage of the heating rate shown in Table 1 is the ratio in percentage of the value obtained by subtracting the heating rate in Comparative Example 1 from the heating rate in each Inventive Example, and then dividing the subtracted value by the heating rate in Comparative Example 1. It was observed that the Inventive Example 1, in which the ferromagnetic body has a shape that surrounds the steel pipe ends, had the highest heating rate, with an improvement of 21% in the rate compared to Comparative Example 1. Moreover, in Inventive Example 2, in which the ferromagnetic body was formed so as to surround only above the steel pipe ends, the rate improvement was 17%, which is slightly lower than that of Inventive Example 1. In Inventive Example 3 in which the core (ferromagnetic body) was inserted between the steel pipe ends, the improvement of the heating rate was 9%. On the other hand, in Comparative Example 2, in which the core was disposed on the upper portion of the steel pipe end surfaces, no improvement effect of the heating rate was observed. Moreover, when comparing temperatures of the thermocouple which was installed at a position which is 30 mm upstream from the induction coil, a heating of about 350° C. was observed in Comparative Examples. However, it was observed that the heating could be effectively suppressed in the invention.

Experiment 2

In order to confirm the effect when the ferromagnetic body was disposed in the peripheral of the induction coil, as the ferromagnetic body 21, a ferrite core having the thickness of 20 mm was disposed in the outer peripheral of the induction coil with a gap of 5 mm to the induction coil, and the same heating tests as in the above-described Experiment 1 were performed. As a result, the improvement effect of the heating rate of 7 to 9% was observed in Inventive Examples 1 to 3 compared to Experiment 1. In addition, even in the case of Comparative Example 1 in which the ferrite core was not provided as the ferromagnetic body between the steel pipe end surfaces of the portion upstream than the induction coil, it was observed that the improvement effect of the heating rate was 11%.

Experiment 3

In the case of Inventive Example 3 of the Experiment 1 in which the heating in the upstream of the induction coil was 65° C., the heating at a position which is 50 mm further upstream than the upstream end of the ferrite core (ferromagnetic body 9) was 36° C. In Experiment 3, in addition, a shield plate 22 made of a copper plate having a thickness of 5 mm and a hole of 50 mm in the diameter so that the steel pipe passes through, was installed at a position which is separated by 30 mm from the upstream end of the ferromagnetic body 9, and the same heating tests as the Experiment 1 were performed. As a result, the heating at the position which is 50 mm further upstream from the upstream end of the ferromagnetic body 9 was 0° C., and it was observed that the current toward upstream could be completely blocked.

Experiment 4

In actual manufacturing line, a K thermocouple was attached to the ferrite core used in Inventive Example 2 of the Experiment 1 as the ferromagnetic body 9 and wound by a glass tape, and the ferromagnetic body 9 was installed in the ferromagnetic body case having the structure shown in FIG. 16. In addition, when manufacturing the steel pipe having a diameter of 49 mm, the ferromagnetic body 9 was installed in the state where water was cut from the cooling nozzle 20, the temperature of the ferrite core of the ferromagnetic body 9 increases to 62° C. during 30 minutes, it was observed that the power saving rate decreased by 4%. Moreover, it was found that a large amount of scales was attached on the outer peripheral on one side of the ferrite core which faces the steel pipe end surfaces, so that the scales came in contact with the steel pipe end surfaces. However, damage to the ferrite itself was not observed. Next, cooling water was discharged to the ferromagnetic body 9 with a flow rate of 10 L/min from the cooling nozzle 20 provided above the ferrite core, and the similar operation was performed. As a result, the temperature of the ferrite core did not increase at all, and decrease of the power saving rate was not observed. In addition, the scales attached when the cooling water was not discharged were not substantially observed, and damages such as cracking did not occur.

Experiment 5

In Experiment 5, a parallel opening portion having the width of 10 mm as shown in FIG. 1 was formed in a steel pipe for a gas pipe having the outer diameter of 38 mm and the thickness of 3 mm. Thereafter, an inclined portion up to the joint 6 is laser processed to have an angle of 3°, so that the joint 6 imitates the welding portion. And tests was performed with the disposition of the induction coil 3, the ferromagnetic body 21, and the joint 6 as shown in FIG. 17. In addition, the present tests were performed in the state where the ferromagnetic body 9 shown in FIG. 17 was not provided. Moreover, in the tests, the induction coil 3 having the outer diameter of 78 mm was used, and a ring shaped core made of a ferrite in which the entire circumference was continued, the outer diameter was 100 mm, and the inner diameter was 90 mm as shown in FIGS. 19 and 21 was used as the ferromagnetic body 21.

In Inventive Example 4, the apparatus as shown in FIG. 21 was used, and the structure was like the following. A ring shaped core made of a ferrite having the outer diameter of 100 mm and the inner diameter of 90 mm was used, a copper plate having the thickness of 3 mm to which a water-cooled copper pipe having a diameter of 10 mm was soldered to the outer circumference, was wound and adhered by insulating adhesives. In addition, cooling water was passed through the copper pipe.

In Inventive Example 5 and Inventive Example 6, the apparatus as shown in FIG. 19 was used. The constitution was as explained in the following. An epoxy pipe having the thickness of 3 mm was covered on the induction coil 3, divided ferrite cores which are 16 in the number and have the width of 10 mm, the height of 25 mm, and the length of 70 mm were arranged in the outer circumference, water-cooled copper pipes having a diameter of 10 mm were disposed between the adjacent ferrite cores, and the copper pipes were adhered to the ferrite cores by insulating adhesives. Here, Inventive Example 5 is a case without cooling water in the copper pipe, and Inventive Example 6 is a case with the cooling water in the copper pipe.

Moreover, in all of the apparatus used in any one of Inventive Examples 4 to 6, the core was continuous in the entire circumferential direction, and a portion thereof was partially notched by 30 mm, to run therethrough the lead portion to the power source of the induction coil.

Moreover, a case where the ferromagnetic body shown in FIG. 3 was not disposed in the outer circumference of the induction coil was set to Comparative Example 3.

An electromagnetic field analysis was performed with respect to each of Inventive Examples 4 to 6 and Comparative Example 3, and it was observed that the magnetic flux just below the induction coil 3 increased and the induction current generated on the surface of the metal strip just blow the induction coil increased in Inventive Examples 4 to 6 as compared to Comparative Example 3. Accompanied with the increase of the induction current, the current toward the joint 6 to be welded also increased.

In the present tests, the heating rate from the room temperature to 800° C. at the joint 6 and the heating at the thermocouple attached to the end (B portion in FIG. 17 and C portion in FIGS. 19 and 21) of the ferrite core were measured.

As the detailed structure in the vicinity of the induction coil, an induction coil was used in which a water-cooled copper pipe having a diameter of 10 mm was separated by 10 mm from the steel pipe and which was wound by two turns and had the outer diameter of 78 mm, and the width in the longitudinal direction of 50 mm. The induction coil was disposed so as to be separated 150 mm upstream from the joint. Moreover, power of 30 kW was input in a resting state using a power source of 200 kHz. The time until the temperature of the joint 6 was heated from room temperature to 1000° C. were measured, and average heating rates were obtained. Here, the temperatures were measured by welding a 50 μm K thermocouple to the edges of the copper pipe ends. Moreover, the impeder 8 was disposed in the inner portion of the steel pipe. A core made of a ferrite having a diameter of 16 mm and a length of 300 mm was used as the impeder 8, in which a hole of 6 mm are formed in the center.

The results are shown in Table 2.

TABLE 2

|  |  | Improvement Percentage of Heating Rate | Heating in Ferrite Core |
|---|---|---|---|
| The Present Invention | Invention Example 4 | 1.15 | 2 |
|  | Invention Example 5 | 1.08 | 5 |
|  | Invention Example 6 | 1.08 | 0 |
| Comparative Example | Comparative Example 3 | 1.00 | — |

In Table 2 the improvement of heating rate at the joint 6 are shown in percentage with the heating rate in Comparative Example 3 as 1. Inventive Example 4, having the shape in which the entire induction coil was surrounded by the ferromagnetic body 21 formed of the ferrite core of the ferromagnetic material, had the highest heating rate. It was observed that Inventive Example 4 had a rate improvement of 15% as compared to Comparative Example 3. In addition, the heating rates of Inventive Examples 5 and 6 in which ferrite cores of a ferromagnetic material divided into 16 sections were used as the ferromagnetic body 21 also was slightly lower compared to Inventive Example 4. However, Inventive Examples 5 and 6 showed improvement of the heating rate by 8% compared to Comparative Example 3. On the other hand, in regard of the heating of the ferrite core, the temperature in the vicinity of corners of the core easily increased. A heating of 2° C. was observed in Inventive Example 4, and a heating of 5° C. was observed in Inventive Example 5. However, heating was not at all observed in Inventive Example 6 to which water cooling was applied.

In the above-described Experiments, the improvement effects on the heating rate when the electric-resistance-welded pipe is heated in the present invention by inputting the same power were confirmed. From the above results, it became clear that the welding efficiency of the electric-resistance-welded pipe welding was effectively increased by a simple apparatus. Moreover, when the welding was performed by the same heating rate as that of Comparative Examples, it was also became clear that the power consumption may be smaller. In addition, compared to Comparative Examples of the related art when the same power was input, it was also became clear that the line speed could be increased.

Experiment 6

The Experiment 5 was the heating test in the resting state for saving power. However, in order to confirm influences of the heating in more detail, a continuous heating tests in which the welding was performed with high output while the steel plate was carried was performed, and the effects was confirmed. In the present tests, a case where water flowed to the ferrite core used in Inventive Example 4 of the Experiment 5 and tested was set to Inventive Example 7 according to the present invention; a case where the water did not flow was set Inventive Example 8; a case which used the cooling ferrite core of the structure in which the lower portion of the ferrite is connected in the structure shown in FIG. 20 due to the fact that the ferrite and the water-cooled structure disposed in the position corresponding to the upper portion of the steel plate opening portion were removed from the ferrite including the cooling structure as used in Inventive Example 5 and Inventive Example 6 was set to Inventive Example 9; a case where induction coil was independently used was set to Comparative Example 4. In addition, in the present tests, the temperature increase of the ferrite core after heating was performed for 30 minutes, whether or not abnormalities of the ferrite was present, burnout conditions of the impeder, and the like were compared.

In the present tests, the steel plate having the thickness of 3 mm was molded so as to have the external shape of 38.1 mm, and then welded. For the impeder, a laminated body of electromagnetic steel sheet foil having the cross-section of 100 mm$^2$, a coil made of a water-cooled copper pipe which was wound by two turns and had the inner diameter of 60 mm, the outer diameter of 90 mm, and the width of 50 mm was weld by making high frequency current of 180 kHz in the coil. The power at the time of the welding was constant as 450 kW. Moreover, the temperature of the ferrite was measured by a contact type K thermocouple after the tests.

The results are shown in Table 3.

TABLE 3

|  |  | Temperature of Ferrite After Test ° C. | Damage Condition of Impeder | Comment |
|---|---|---|---|---|
| Inventive Examples | Inventive Example 7 | 27 | Slightly Deformed |  |
|  | Inventive Example 8 | Crack Occurrence in Ferrite | — | Crack Occurrence in Short Time After Energization |
|  | Inventive Example 9 | 10 | Abnormality is not present |  |
| Comparative Example | Comparative Example 4 | — | Slightly Deformed |  |

As shown in Table 3, although the temperature slightly increased in Inventive Example 7 and Inventive Example 9, those could still be stably used. However, in Inventive Example 8 which is the same structure as that of Inventive Example 7, cracks of the ferrite started in a short time after the energization starting, and the tests was stopped. Thereby, it was confirmed that under a high-power output condition, the apparatus could be stably used by providing the water-cooled structure. Moreover, the shape of the impeder was examined after the tests. In Comparative Example 4 and Inventive Example 7, a small amount of ablation occurred between layers of the laminated portions in the impeder just below the induction coil, and it was also confirmed that the impeder was deformed. However, in Inventive Example 8, absolutely no abnormality was found in the impeder, and it was observed that the impeder was sound. Therefore, it was confirmed that the magnetic flux which flows from the steel plate opening portion into the impeder decreased.

INDUSTRIAL APPLICABILITY

According to the electric-resistance-welded pipe welding apparatus of the present invention, the welding efficiency of the electric-resistance-welded pipe, which makes the metal strip into a cylindrical shape while bending the traveling metal strip and welds it, can be effectively enhanced by a simple apparatus. Thereby, electric power consumption can be decreased, energy conservation can be achieved. On the other hand, in the case where the same power is input, since the line speed can be increased, improvement of the productivity can be realized, and therefore, the industrial effects are significant.

REFERENCE SYMBOL LIST

1: metal strip
2a, 2b: metal plate ends
3: induction coil
4a and 4b: electrode
5a and 5b: current
6: joint
7: roll
8: impeder
9, 91, 92, and 93: ferromagnetic body
91a, 92a, and 93a: slit
92b and 93b: peripheral wall portion
93c: protrusion
10: current distribution
11: thread
12: fixing plate
13: installation base
14: opening portion
15: enclosure
16: bottom plate
17: spacer
18: leg
19: flexible structure
20: water-cooled head (cooling nozzle)
21: ferromagnetic body
21a: cooling channel
21b: cooling plate
21c: cooling pipe
22: shield plate
23: corner portion

The invention claimed is:

1. An electric-resistance-welded pipe welding apparatus, comprising:
   rolls bending a metal strip to have a circular cross section so that a pair of side edges of the metal strip face each other, the pair of side edges spaced from one another in a downstream direction of the rolls to form a gap;
   a heating device provided immediately near the metal strip so that heating is performed with respect to the pair of side edges, and the pair of side edges are welded while being pressed to and coming in contact with each other, the heating device having a center and a first end located upstream from the center of the heating device when viewed along a traveling direction of the metal strip and a second end located downstream from the center of the heating device; and
   a first ferromagnetic body disposed outside the heating device when viewed in a horizontal plane and having a center and a first end located upstream from the center of the first ferromagnetic body and a second end located downstream from the center of the first ferromagnetic body, the first end and second end of the first ferromagnetic body being located upstream from the first end of the heating device when viewed along a traveling direction of the metal strip, the first ferromagnetic body being movably inserted between the pair of side edges of the metal strip,
   wherein the first ferromagnetic body has a portion that extends along the length of the ferromagnetic body in the traveling direction that extends into the gap between the pair of side edges of the metal strip so as to face the pair of side edges of the metal strip, and in a plane view, the first ferromagnetic body is located upstream from the first end of the heating device so that a space exists between the first ferromagnetic body and the heating device.

2. The electric-resistance-welded pipe welding apparatus according to claim 1,
   wherein a surface of the first ferromagnetic body is coated with a material which is non-magnetic and non-conductive.

3. The electric-resistance-welded pipe welding apparatus according to claim 1, further comprising:
   a moving mechanism that moves the first ferromagnetic body so as to avoid damage thereof in the gap between the pair of side edges when the first ferromagnetic body comes in contact with the pair of side edges.

4. The electric-resistance-welded pipe welding apparatus according to claim 3,
   wherein the moving mechanism is a wire material that hangs and supports the first ferromagnetic body.

5. The electric-resistance-welded pipe welding apparatus according to claim 3,
   wherein a shape of the first ferromagnetic body when viewed in a cross-section perpendicular to the traveling direction of the metal strip is a T shape or an H shape which includes a horizontal portion which is disposed in an upper portion of the first ferromagnetic body and a vertical portion which is vertically extended downward from the horizontal portion, and
   wherein the moving mechanism is an installation plate which includes an opening portion into which the vertical portion is inserted so that the vertical portion is positioned between the pair of side edges, and a placement portion which is provided in a periphery of the opening portion and in which the horizontal portion is placed.

6. The electric-resistance-welded pipe welding apparatus according to claim 5, further comprising:
   a member that discharges a cooling medium on the upper portion of the first ferromagnetic body, and
   a spacer that is interposed between the horizontal portion and the placement portion when the horizontal portion of the first ferromagnetic body is placed on the placement portion of the installation plate,
   wherein a space through which the cooling medium passes is provided in the spacer so that the cooling medium moves down to the vertical portion of the first ferromagnetic body when the cooling medium is discharged to the upper portion of the first ferromagnetic body.

7. The electric-resistance-welded pipe welding apparatus according to claim 5, further comprising:
   a member that discharges a cooling medium to the upper portion of the first ferromagnetic body,
   wherein the first ferromagnetic body includes slits which pass the cooling medium, and the cooling medium passes through the slits and moves down to the vertical portion when the cooling medium is discharged to the upper portion of the first ferromagnetic body.

8. The electric-resistance-welded pipe welding apparatus according to claim 1, further comprising a second ferromagnetic body,
   wherein the heating device is an induction coil, and
   wherein the second ferromagnetic body is ring shaped and disposed in an outer circumference of the induction coil.

9. The electric-resistance-welded pipe welding apparatus according to claim 8, wherein the second ferromagnetic body is divided into a plurality of sections along a circumferential direction of the induction coil.

10. The electric-resistance-welded pipe welding apparatus according to claim 9,
wherein a cooling channel to which the cooling medium flows is provided between adjacent sections of the second ferromagnetic body.

11. The electric-resistance-welded pipe welding apparatus according to claim 1,
wherein the heating device is an induction coil, and
a metallic shield plate which shields a magnetic flux generated by the induction coil is also provided further in a portion upstream than the first ferromagnetic body in the traveling direction.

12. The electric-resistance-welded pipe welding apparatus according to claim 1,
wherein the first ferromagnetic body is above the metal strip and extends in the gap.

13. The electric-resistance-welded pipe welding apparatus according to claim 1, wherein the first ferromagnetic has a T shape, an inverted T shape, or an H shape cross-section.

14. The electric-resistance-welded pipe welding apparatus according to claim 1, further comprising:
an impeder installed in an inner portion of the bent metal strip,
wherein the first ferromagnetic body is vertically separated from the impeder.

* * * * *